United States Patent [19]

Curiel

[11] Patent Number: 4,555,258

[45] Date of Patent: Nov. 26, 1985

[54] PRESSING MACHINE FOR THE MANUFACTURE OF GLASS ARTICLES

[75] Inventor: Jesus V. Curiel, Monterrey, Mexico

[73] Assignee: Vitro Tec Fideicomiso, Monterrey, Mexico

[21] Appl. No.: 608,478

[22] Filed: May 9, 1984

[30] Foreign Application Priority Data

May 13, 1983 [MX] Mexico ................................. 197273

[51] Int. Cl.$^4$ ............................................ C03B 11/02
[52] U.S. Cl. ....................................... 65/319; 65/265; 65/267; 65/355; 65/356
[58] Field of Search ................ 65/319, 321, 265, 267, 65/355, 356

[56] References Cited

U.S. PATENT DOCUMENTS

| | | | |
|---|---|---|---|
| 1,560,062 | 11/1925 | Kucera | 65/319 X |
| 2,751,715 | 6/1956 | Denman | 65/319 X |
| 2,811,815 | 11/1957 | Eldred | 65/356 X |
| 3,119,681 | 1/1964 | Vogelpohl | 65/356 |
| 3,150,951 | 9/1964 | Mayhew | 65/321 X |
| 3,203,777 | 8/1965 | Berry et al. | 65/267 X |
| 3,291,588 | 12/1966 | Lippmann et al. | 65/319 X |
| 3,416,908 | 12/1968 | Goodwin et al. | 65/355 X |
| 4,426,218 | 1/1984 | Cabrera-Montanté et al. | 65/267 X |

*Primary Examiner*—Arthur Kellogg
*Attorney, Agent, or Firm*—Abelman Frayne Rezac & Schwab

[57] ABSTRACT

An improved pressing machine for the manufacture of glass articles, including a gyratory table composed of six mold supporters laid out equidistantly around the circularity of the table and at an intermediate position in respect of its radius, thereby moving the molds from one station to the next, as the table gyrates; six stations associated with such table, namely: a station for receiving the glass-gob charge, a pressing station, two article-cooling stations, one extracting station and one mold-cooling station; a system for the external cooling of the supporters and molds, formed by a source of cooling air and a plurality of ducts—internal and external—on the mentioned table, each one corresponding to each mold and mold-supporter, for sweeping the external surfaces of the supporters and molds; and a system for the continuous internal cooling of articles, same which encompasses, for each molds supporter, a cooling device consisting of ducts for causing certain cooling fluid to circulate in order to cool the articles either directly or indirectly, and formed by a cooling member directed towards the mold, a laying arm which displaces said cooling member between an active and a passive position, being such arm coupled to the gyratory table, so as to travel along with it and with its associated mold, in any of its positions—whether active or passive—, and a mechanism designed to displace the cited arm between its two positions.

15 Claims, 8 Drawing Figures

PRESSING MACHINE FOR THE MANUFACTURE OF GLASS ARTICLES

FIELD OF THE INVENTION

The invention herein described is related to an improved pressing machine for the manufacture of glass articles and, particularly, to a pressing machine aimed at producing glass articles such as jars, plates, glasses, etc.

BACKGROUND OF THE INVENTION

The machines for the manufacture of glass articles such as the ones heretofore mentioned have been well-known for a long time, and they consist, basically, of a gyratory table provided with a plurality of mold supporters—carrying respective molds for the manufacture of glass articles—which gyrate simultaneously with the table, passing through a number of stations, among which are stations for charging, stations for pressing and cooling of articles, extracting stations, and stations for the cooling of molds or moldings, so as to achieve—in a complete cycle—the production of a finished article already cooled to be taken out of the machine and passed onto a belt conveyor, as well as the further total cooling of the mold, in order to renew the cycle with the charging of another glass gob, thus continuing the manufacture of articles.

It is well-known, however, that one of the main problems of this type of machines for the manufacture of glass articles is the cooling of both, the articles themselves and the molds or moldings, wherefore it is necessary that said machines contain a relatively high number of stations, therefore being usual to provide them with a charging station, a pressing station—located after the charging station—, three article-cooling stations, one extracting station and two mold-cooling stations. The number of stations specified above is referred to a machine composed of eight molds, but the number of stations—both for the cooling of articles and for the cooling of molds—may vary, depending upon the number of molds of the machine—which may—consist of 8, 12, 16, 24 or 36 (where the two last machines include 2 or 3 forming pistons and a double or triple intermittent movement)—. The article-cooling stations are particularly necessary, since the article is cooled at each station solely and exclusively during the time such article remains at said each station, and thus, for instance, a 12-mold machine must have 5 article-cooling stations, a 16-mold machine must have 7 article-cooling stations, and so on; so that the number of article-cooling stations in fact occupies half of the total room available in a machine, circumstance, this one, which entails certain disadvantages, on account of the considerable reduction of the rate of production.

If the article-cooling and the mold-cooling stations could be reduced in a considerable proportion, a machine with fewer molds could produce a greater number of articles-per-mold, thereby increasing its efficiency. Nevertheless, all attempts performed thus far for attaining a reduction of the number of cooling stations in a machine designed for the manufacture of glass articles of the nature stated above have been fruitless, since all of them were bases on providing cooling solely and exclusively during the time the article remains at the station, wherefore the special cooling devices designed thus far have been rather unuseful for reducing the number of cooling stations. Among these devices are the cooling hoods—which are placed in the manner of a cover over the mold at each of the molding-cooling stations—, through which an air blast is caused to circulate—entering through the top part of the hood and getting out through either annular or lateral chutes or channels—, thereby attaining the acceleration of the cooling of the mold, but not achieving an important reduction of the number of cooling stations; since each cooling station contains a cooling device entering and getting out as the mold arrives and stays at the station, thus limiting the cooling process solely and exclusively to the time the molds remain at each cooling station.

Therefore, as it may be realized from the aforesaid, specialists have for long time searched for a means for increasing the efficiency of the article—cooling process in a machine for the manufacture of glass articles, and the devices created thus far have not accomplished this purpose.

SUMMARY OF THE INVENTION

Considering the defects found in the pressing machines—aimed at manufacturing glass articles—of the technique described above, it is one main object of the invention hereinafter claimed to provide a pressing machine for the manufacture of glass articles which may be rather simple as to its construction and which—with a number of molds considerably reduced as compared with the number of molds of the machines of the prior technique—may attain the production of glass articles by increasing the efficiency of the cooling process of such articles.

A second object of this invention is to provide a pressing machine of the kind explained hereinbefore, which contain a reduced member of article-cooling and mold-cooling stations.

A third, specific object of the invention hereinafter claimed is to provide a pressing machine, of the nature heretofore depicted, which be composed of elements for the continuous cooling of the glass articles and the molds, as these travel from station to station, and not only while the same remain at each station.

Another object of the invention hereby claimed is to provide a pressing machine of the type heretofore expressed, which efficiency for cooling the articles may be increased even more by means of the appropriate circulation of a cooling fluid over the surface of the article laid in the mold.

The aforementioned purposes, as well as others which derive of same, are preferably achieved as follows:

In a pressing machine for the manufacture of glass articles—including a gyratory table composed of mold supporters, laid out equidistantly around the circularity of the table, thereby moving the molds from one station to the next as the table gyrates-respective devices for the continuous cooling of articles—related to each mold supporter—are provided, embracing—for each mold supporter—: a cooling member directed towards the mold so as to cause certain cooling fluid to circulate, in order to cool the articles either directly or indirectly, a laying arm which displaces said cooling member between an active and a passive position, being such arm coupled to the gyratory table, so as to travel along with it and with its associated mold, in any of its positions, whether active or passive, and a mechanism for displacing said arm between its two positions, thereby attaining that—immediately after the piston is withdrawn at the pressing station—the cooling member be introduced over the mold, so that the cooling process may start, in a way that may permit it to fulfill its duty on the article, while this moves from the pressing station to the first article-cooling station—during the time the same remains at the article-cooling station and during the time elapsed while it moves to the following stations—, until arriving at the extracting station, where the cooling member is withdrawn, thus achieving a continuous cooling along all performance of the gyratory table, from the prssing station to the extracting station, and, thereafter, the cooling of the mold for its new cycle, thereby making possible a considerable reduction of the number of article-cooling stations. Furthermore, a plurality of ducts—internal and/or external—is provided in the table, to cause air to flow through them, so that it may sweep the whole surface of each mold supporter and the molds themselves, in order to achieve an effective cooling of them.

BRIEF DESCRIPTION OF DRAWINGS

The novel aspects which feature the invention hereby claimed shall be specifically determined in the claiming clauses following below. However, the invention itself—together with other objects and advantages of the same—will be better understood after perusing the description of two specific modalities thereof, in relation to the accompanying drawings, where:

DETAILED DESCRIPTION

Referring now specifically to the drawings, it may be seen that the machine designed according to the invention hereof includes a discoidal gyratory table 1 supported by means of a shaft 2 which rotates it in a synchronized relation in respect of the performance of the various stations working on the table where the glass to be converted into finished products is received—fixed to the center of said axle 2 by means of a shaft 40. The gyratory table 1 is provided with a plurality of cooling devices 3, each of which is coupled to the gyratory table 1—so as to move along with it—and associated with a respective mold supporter which may pass from one station to the other ones associatd with the gyratory table 1 of the invention hereof.

The stations which compose the machine of this invention include: a charging station 4, where through adequate feeders not being part of the invention hereof, respective glass gobs 46 are fed, in order to be processed by the following stations. A pressing station 5 works on the glass gob 46 as shall be later described in full detail, so as to form a glass article. Two stations 6 and 7 for the cooling of articles are successively laid, to be operated as shall be later described in full detail; an extracting station 8 comes afterwards, where from the finished products are taken out of the molds by means which shall be later described in full detail too, thereafter passing onto a belt conveyor 21 which carries them to the remaining sections of the process, and finally, a molding-cooling station 9, which is the last station of the machine built in agreement with the invention hereof; where from the mold, resting upon its corresponding supporter, passes again to the charging station 4, in order to repeat the aforementioned cycle. All the steps above may be clearly seen in FIG. 1 of the accompanying drawings.

Figure 2:
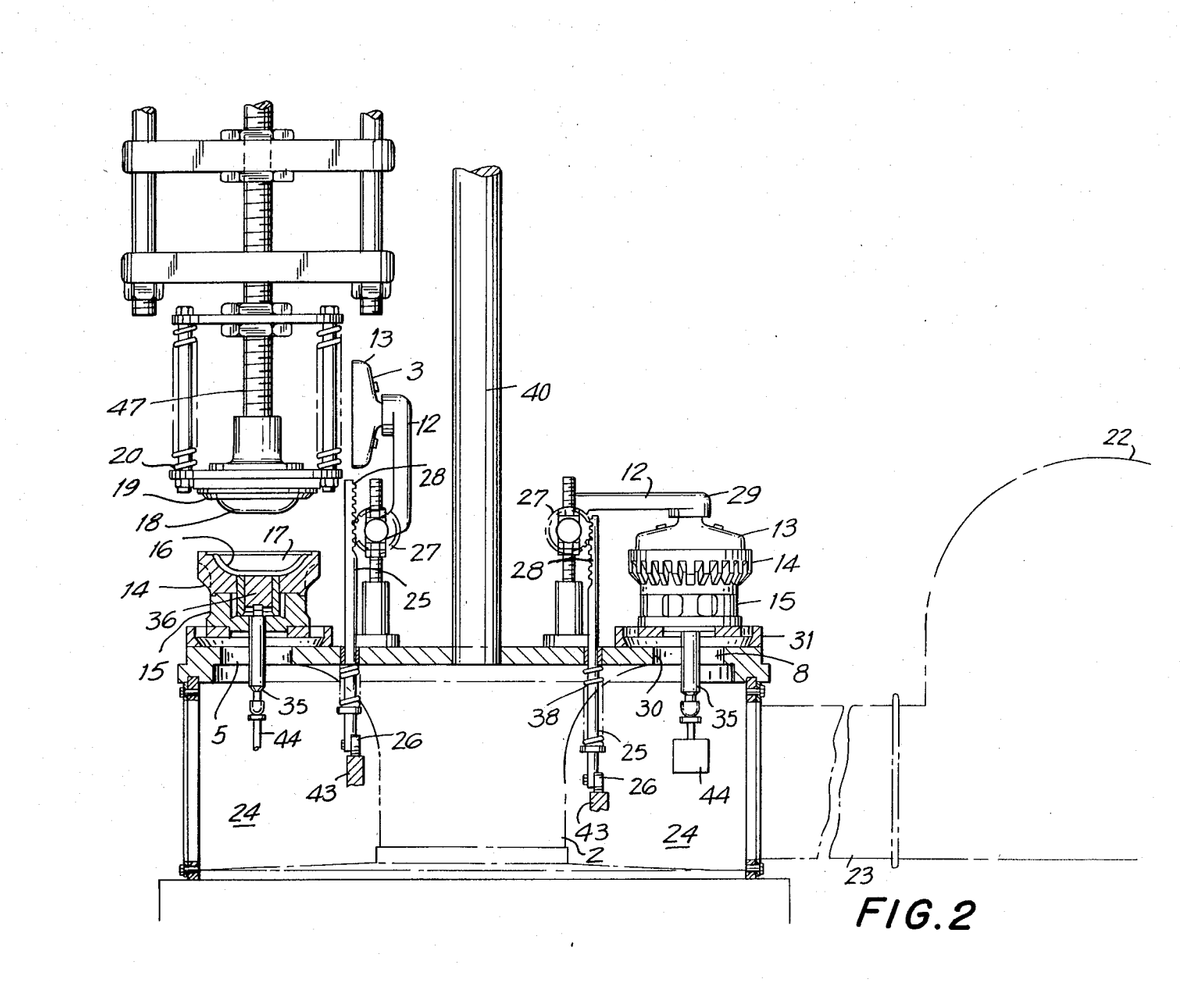
FIG. 2 is a cross section view, in elevation, drawn along 2—2 of FIG. 1, and observing the mechanism in the direction of the arrows.
Figure 6:
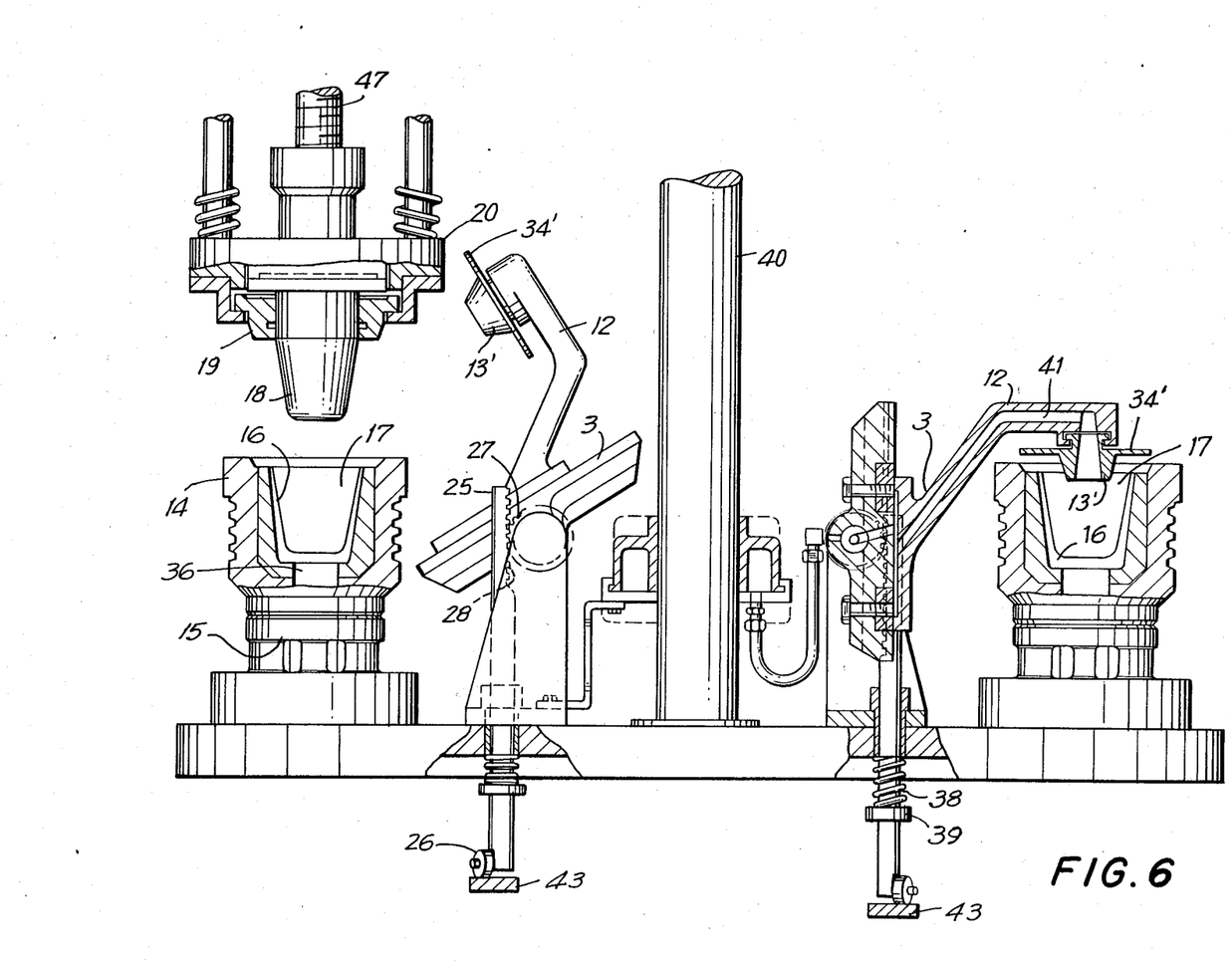
FIG. 6 is a view similar to that appearing in FIG. 2, which displays a second modality of the pressing machine—claimed hereby as the invention.
Figure 8:
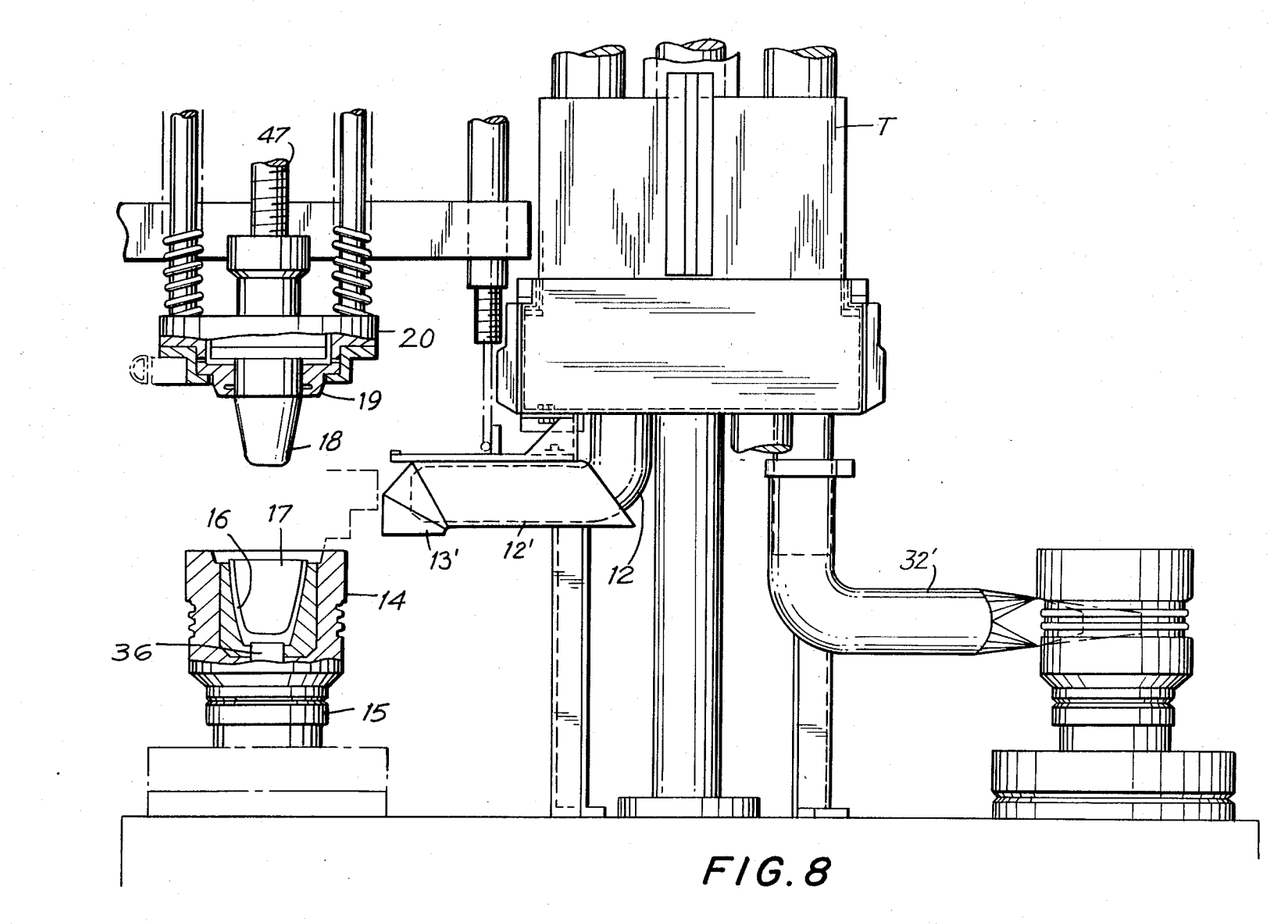

As far as the pressing station 5 is concerned, the same—together with the extracting station 8—is clearly illustrated in FIGS. 2, 6 and 8 of the drawings, wherein—as it may be seen—all parts forming the said stations are shown, same which will be hereafter described.

It should be noted, in this first modality, that the table 1 includes a plurality of openings 30—six, to be precise—over which an external cooling plate is laid 31, being later described in full, and over such cooling plate the mold supporter 15 is placed, same which carries a mold 14 on its top part mold, this one, which is adequately shaped so as to contain a cavity 17 within which article 16 is pressed by means of a pressing mechanism 47 comprising a piston 18 composed of a peripheral ring 19 which seals properly the said cavity 17 at the moment of pressing article in its glass-gob form 46 shown in FIG. 1, being such piston supported by a basket 20 which in turn is coupled to the pressing mechanism 47, which has adequate means for making the piston 18 go up or down, so as to press article 16 within the cavity 17 of the mold 14. In this way, the gyratory table 1 receives at the station 4, through proper feeders, as it was pointed out before, a glass gob 46 of proper size and weight, same which is later carried, within certain controlled time, towards the pressing station 5 whereat, immediately after the arrival of gob 46 within model 14, it is pressed by means of piston 18 which is caused to go down by the pressing mechanism 47, in order to form article 16 illustrated in FIG. 2 of the drawings.

At the pressing station 46, immediately after piston 18 is withdrawn, the operation of the internal cooling devices for articles is started, including, in this first modality, a cooling hood 13 in each of the six positions which occupy the openings 30 and the mold carriers 15, so that each cooling device 3 may operate separately at the respective stations, in accordance with what is hereafter described.

Figure 7:
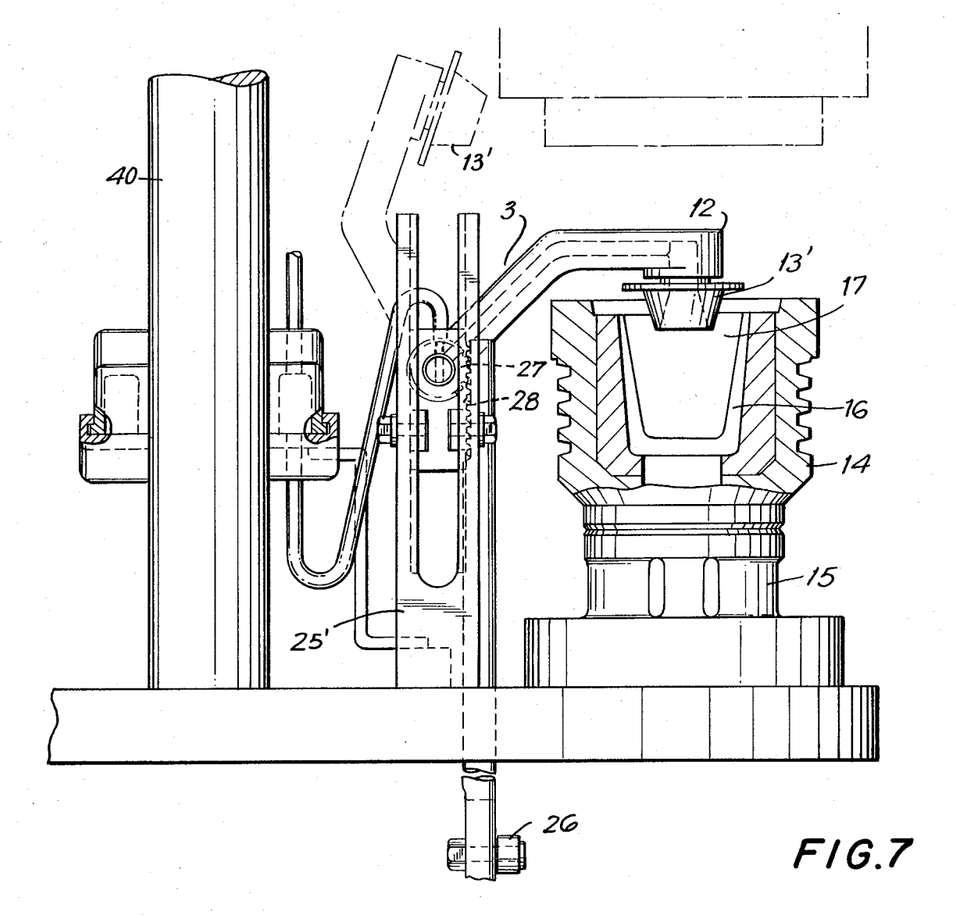
FIG. 7 is a view similar to that appearing in FIG. 6, showing a second modality of the mechanism for displacing the article-cooling devices; and, FIG. 8 is a view similar to that appearing in FIG. 2, showing a third modality of the pressing machine claimed hereby as the invention.

Normally, the cooling device or unit 3 encompasses a hood 13, which may be of any adequate type, or otherwise a duct or nozzle 13' as in the modalities illustrated in FIGS. 6, 7 and 8, or other kind of cooling devices known in the field, being the essential and novel feature of the invention hereof the fact that there is a device 3 for the continuous cooling of each mold carrier 14 laid out on the gyratory table 1, in order to attain the continuous cooling, for a long period of time, by means of the operation which shall be described hereinafter. So—even though the cooling operation shall be hereafter described as consisting of a hood 13, as illustrated in the drawings—, it must be underlined that said cooling may be effected in any other manner, inclusively by means of the installation of a continuous cooling tunnel which cover stations 6 and 7 as well as the distance which separates these stations from stations 5 and 8, respectively, being the main characteristic of this invention that the internal cooling of article 16 formed within cavity 17 of the—mold 14, be performed since piston 18 is withdrawn from cavity 17 of the mold 14, until immediately before the pusher 36—which shall be later described—pushes the article onto the belt conveyor 21, in order to be transported towards other areas of the manufacturing process.

Figure 4:
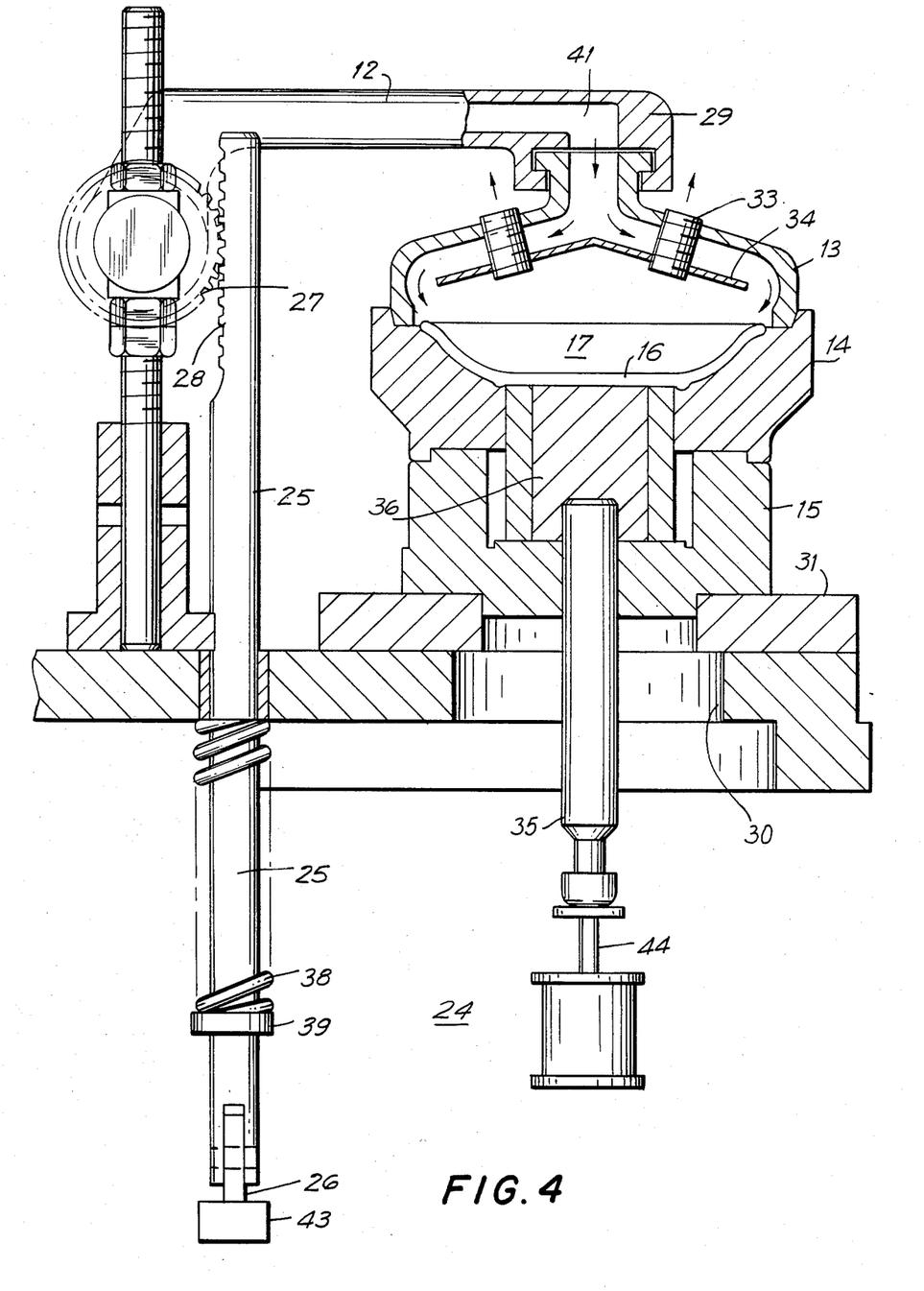
FIG. 4 is a cross secltion view of the mold shown in FIG. 3, displaying certain parts properly sectioned, in order to show all the internal details.

Each cooling device, as illustrated clearly in FIGS. 2 and 4 of the drawings, includes a hood (bell) 13, in accordance with the modality specifically shown in said drawings, that in this particular case is composed of a deflecting plate 34—placed in the interior thereof and supported by the hood 13 by means of a plurality of ducts 33—for the outlet of circulating air. The hood 13 is coupled to a nozzle 29 which in turn is part of the end of arm 13, providing an air conduit 41 for air flowing along the whole arm 12 and which is coupled by means of a hollow pinion 27 to a general air duct 37, which causes air to circulate through feeding conduit 41, to get out through nozzle 29 and make it hit the deflecting plate 34, in the direction indicated by the arrows appearing in FIG. 4 of the drawings. So, the air is distributed about the deflecting plate 34 and tangentially and totally sweeps the surface of article 16 formed within the mold 14 in the cavity 17 thereof, later circulating upwards so as to come out—through exhaust ducts 33—to the atmosphere, as it is also clearly illustrated in FIG. 4 and indicated by the arrows appearing therein.

In the modality of FIGS. 6, 7 and 8, a duct or nozzle 13' is provided, placed on a peripheral plate 34' which covers cavity 17 only in part, in a way that cooling air may be directed towards article 16 and come out through the external peripheral portion of plate 34'.

The mechanism of arm 12 is shown open in FIGS. 2, 6 and 7, and closed in FIGS. 3, 4, 6 and 7; depending exclusively, in the two first modalities, on a pinion 27 geared with a toothed section 28 of a rack 25 passing through table 1, so as to be moved by means of a mechanism which shall be hereafter described.

In order to adjuts the height of arm 12 and the position of hood 13 or nozzle 13', in the modality of FIG. 7, a rack in "U" form 25' is provided, in which the position of pinion 27 is adjusted, pinion to which the mentioned arm 12 is fixed.

The rack 25 at the bottom of table 1, is composed of a stop 39 over which a helical spring is laid 38, which bottom end rests on said stop 39 and which top end rests on the bottom surface of table 1, such rack extending downwards until forming a follower 26—at its bottom end—which through cam 43, illustrated in FIG. 2 of the drawings, is moved upwards and downwards, so as to overturn arm 12 between a closed position, as shown in FIG. 4 (or on the right side of FIGS. 2 and 6) and an open position, appearing on the left side of FIGS. 2 and 6.

While the cooling device is in its open position—and immediately after piston 18 leaves cavity 17 of the mold 14—the device 3 enters by the action of cam 43 on the follower 26 of rack 25, thereby covering hood 13 the mold carrier 14 as shown on the right side of FIGS. 2 and 6 and in FIG. 4. In this very moment, air is caused to flow as hertofore described, thus commencing to cool article 16 through the sweeping of the internal surface of same, by means of the air blast directed by the deflecting plate, in accordance with the process cited hereinbefore.

Figure 1:
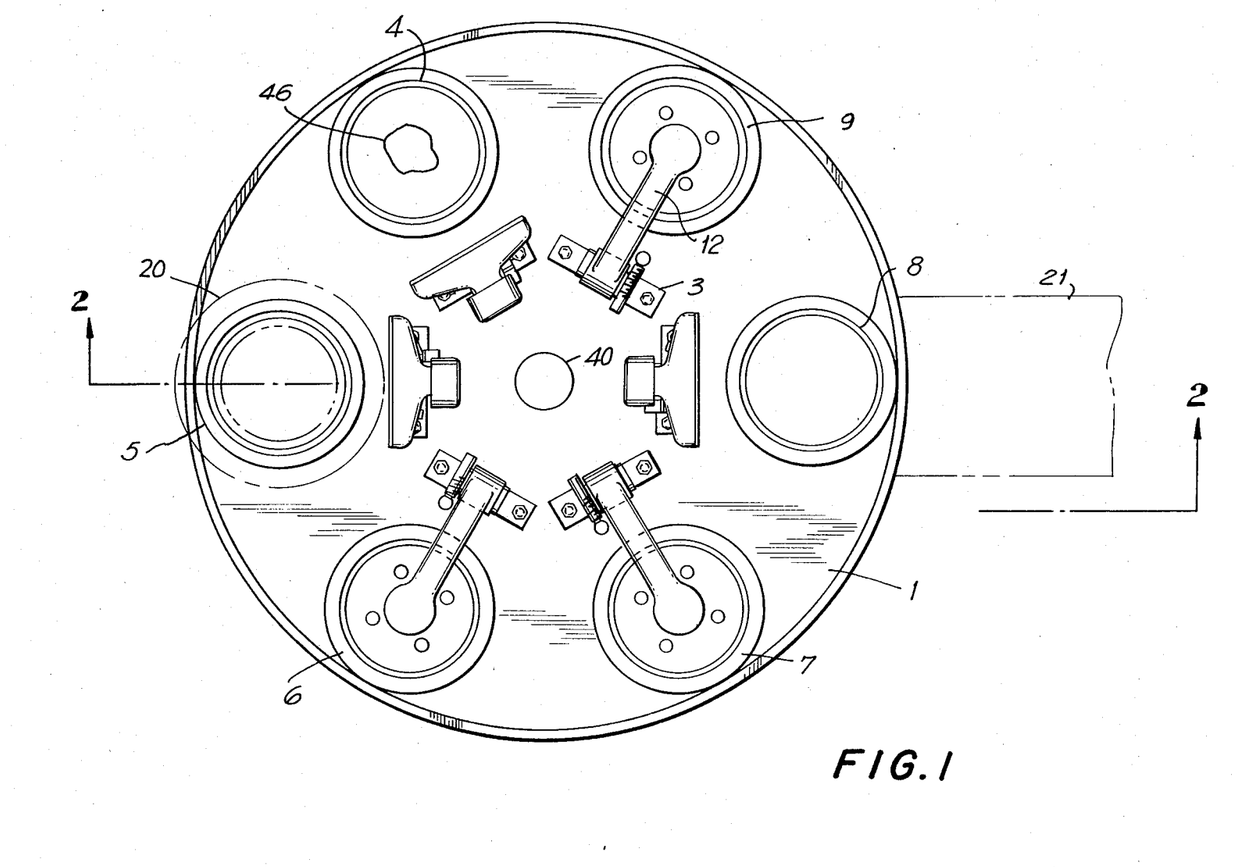
FIG. 1 is an in-plant, top view of the pressing machine for the manufacture of glass articles, built in agreement with a first modality of the invention hereof, showing the cooling devices for the articles, respectively, in their active and passive positions.

This action takes place from the moment piston 18 comes out, through the stay of the respective mold carrier at article-cooling stations 6 and 7, as shown in FIG. 1, and until the arrival of said article to the extracting station 8, moment in which arm 12 and hood 13 are withdrawn, thereafter driving an extractor 33—which is also illustrated clearly in FIG. 4 of the drawings—, thereby pushed out article 16 and passing in onto belt conveyor 21, for its later being extracted from the machine.

A simplified version of the cooling device 3 for articles and of its operating mechanism, is illustrated in FIG. 8, encompassing a gyratory drum T for the distribution of cooling air, from which extend the respective hollow arms 12 for each station, each of which includes a telescopic arm 12' which slides linearly over the first by means of a fluid-operated cylinder-and-piston set, so as to lay duct or nozzle 13' in correspondence with cavity 17 of the mold and the withdraw it therefrom.

In accordance with what was hertofore described, the course for the cooling of article encompasses the moment it leaves pressing station 5 until the time it enters extracting station 8, thus increasing the cooling time for each article considerably, as it may be seen in the data which will be provided below, as compared with the time of a conventional machine containing separate cooling stations, in a way which may allow the design and construction of a machine with a reduced number of stations, for the cooling process is performed not only while article actually is at any of the various cooling stations, but also when the same completes its course from station to station, embracing the two cooling stations and the pressing and extracting stations.

The extracting station 8 of the machine designed in accordance with the invention hereof, includes an extracting-mechanism consisting of an extracting piston 36—which is part of the bottom of cavity 17 of the mold 14, as shown clearly in FIG. 4 of the drawings—, which is coupled by the bottom end thereof to a pusher 35 having at the bottom thereof a fluid-powered cylinder-and-piston set 44 which, at the moment article 16 is to be pushed out of cavity 17 of the mold 14, causes the pusher 35 to go up, thereby elevating piston 36 and pushing the cooled article 16 outwards—out of cavity 17 of the mold 14—, in order to let it drop—by certain means which are well-known and the inclusion herein of the description of which is not pertinent—onto an extracting belt conveyor, on which it travels to other areas of the manufacturing process.

The mold-cooling station 9 may be reduced, as well, to one single station, on account of the fact that the mold is—cooled both externally—as will be described later on—and internally, in view that, once the article is extracted, the cooling device 3 enters again to cool the mold internally, as opposed to the technique of other system whereby the mold is cooled externally, as shall be later explained.

Figure 3:
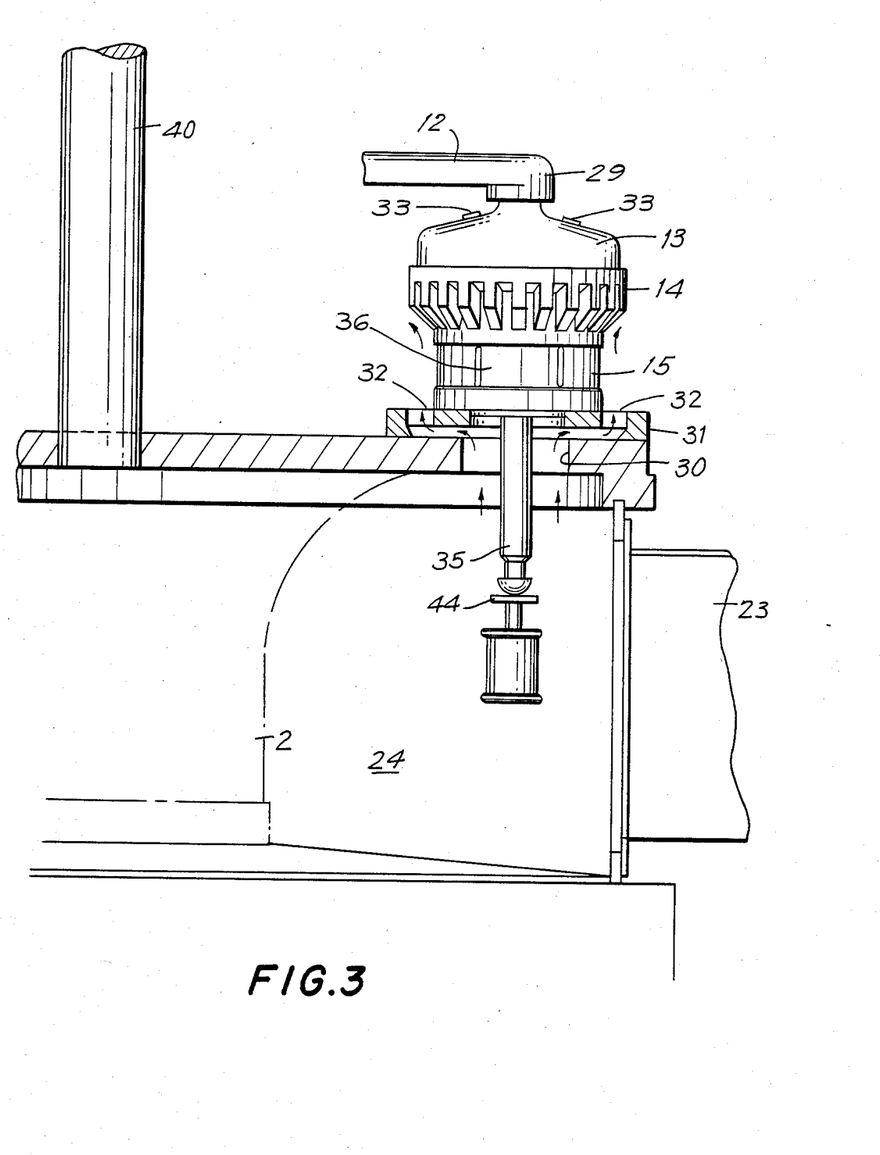
FIG. 3 is a partial view—in detail—of one of the molds of the machine built in accordance with the invention hereof, displaying the right side of the machine shown in FIG. 2.
Figure 5:
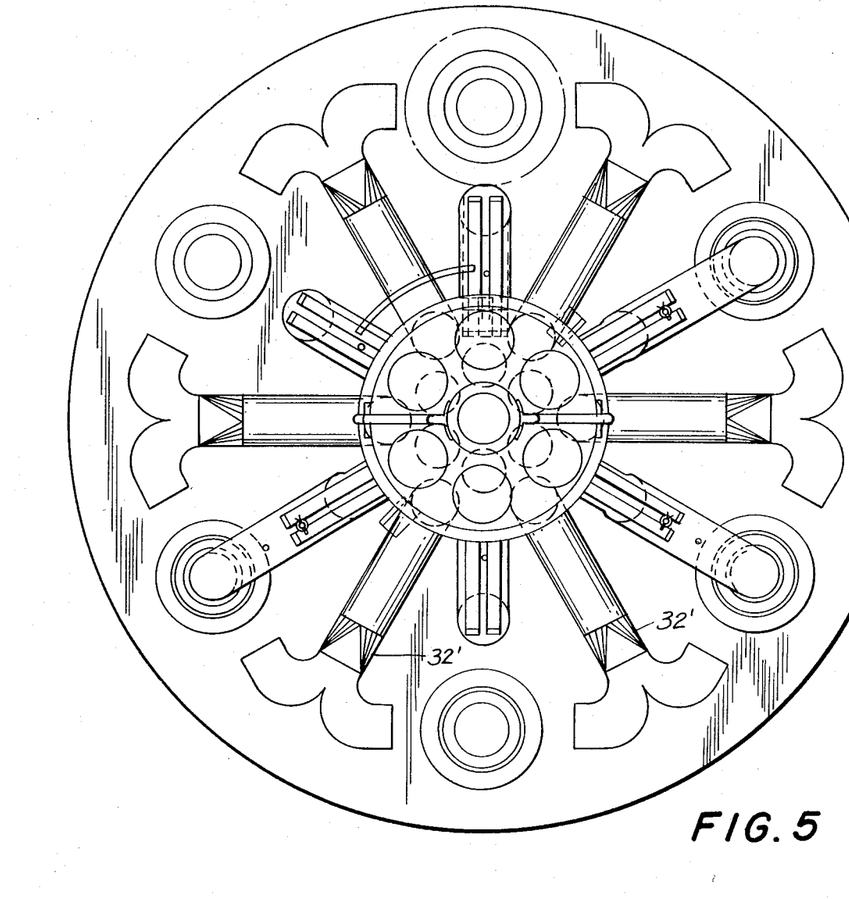
FIG. 5 is an in-plant, top view, similar to that appearing in FIG. 1, which illustrates a second modality of the device for the external cooling of supporters and molds, as well as the device for the internal cooling of articles.

The mechanism for the external cooling of molds is clearly illustrated in the modality of FIG. 3 of the drawings, where it may be seen that the external cooling plate 31 encompasses a plurality of conduits 32 through which air flows outwards, immediately over the surface of the mold carrier 15 and the mold 14, so as to sweep entirely the vertically-threaded surface of such molds—as shown by the arrows appearing in FIG. 3 of the drawings—; and the air coming out through openings 32 is later blown through opening 30 from plenum chamber 24—which is fed with air of duct 23, connected with a ventilator (fan) 22, as shown clearly in FIGS. 2 and 3 of the drawings. This mechanism may be further simplified—as appearing in the modality of FIGS. 5 and 8—by providing a plurality of ducts 32' connected with the gyratory drum T for the distribution of cooling air, each of which bifurcates on its end for simultaneously directing cooling air towards one of the vertically-threaded peripheral faces of two adjacent molds. Thus, the external cooling of the mold is made continuously at all stations, while the external cooling of the molds or moldings is assisted by the internal cooling produced by the cooling devices 3, which start to function immediately after the article has been taken out, performing said cooling from the extracting station 8, through all the time the mold stays in the mold-cooling station 9, and there from to the charging station 4, where the cooling device 3 comes out to permit gob 46 to be fed, so as to repeat the cycle of the machine designed and built in accordance with the invention hereof; gob which, as aforesaid, may be of a size rather reduced, on account of the considerable increase of efficiency as to the cooling process, attained by the cooling devices 3 described above.

In order to compare the efficiency of this type of—machines-built in accordance with the invention hereof—and that of the conventional machines, the following consideration may be made. By using a conventional machine composed of 24 molds and two pistons, the same shall produce 110 articles per minute. The novel lay-out in agreement with the invention hereof would yield 200 articles per minute with 24 molds, by the drive of 4 pistons, this is to say, one per machine. In other words, the utilization of the mold is improved in a proportion of 4.58 to 8.33 articles per minute and per mold, as opposed to the conventional machines which are not provided with the cooling devices of the machine designed in accordance with the invention hereof.

From the aforesaid may be inferred that, for the first time, a machine with gyratory table for forming glass articles by the pressing process has been built, same which may be rather reduced in size and highly efficient as to its production capacity, since the time for the cooling of articles is improved, without needing to wait for the moment in which they be precisely at the cooling stations in order to have separate cooling devices entering into them; for, on the contrary, the cooling devices are conveniently laid out around the circularity of the gyratory table, so that they may travel along with each mold—as the table gyrates—, and, therefore, with each of the formed articles; therein allowing their cooling not only while they are actually at the cooling-stations, but also while they do travel from the pressing station to the first cooling station, from this to the second cooling-station, and from this to the extracting station.

Even though certain specific modalities of the invention hereof have been shown and described above, it must be underlined that many variations to such modalities are, in fact, possible. Therefore, the invention hereof is not to be considered restricted or limited, except as required by the above technique and by the true intendement of the claims hereafter cited.

I claim:

1. An improved pressing machine for the manufacture of glass articles, of the type which includes a gyratory table composed of mold supporters equidistantly laid out around the circularity of the table and at an intermediate position in respect of its radius, thereby carrying the molds from one station to the next as the table gyrates intermittently; featured by a machine encompassing six stations associated with the table, namely: one glass-gob charging station, one pressing station, two stations for the continuous cooling of articles, one extracting station and one station for the continuous cooling of molds; a system for the continuous external cooling of supporters and molds formed by a source of cooling fluid, a plurality of ducts on the table, each one corresponding to each respective mold supporter and mold, for sweeping the external surfaces of the supporters and molds; and a system for the continuous internal cooling of articles, including, for each mold supporter, a cooling device composed of ducts for causing a cooling fluid to circulate in order to cool the articles, which embraces a cooling member, a laying arm which displaces said cooling member between a mold cooling position and a raised inactive position, such arm being coupled to the gyratory table so as to travel along with it and with its associated mold, and a mechanism for displacing said arm between its two positions.

2. An improved pressing machine for the manufacture of glass articles, pursuant to what has been set forth in claim 1, featuring a pressing station including a pressing piston which fits in the associated mold of the gyratory table, a closing ring laid peripherally in respect of said piston; and a pressing mechanism which causes the piston to go up or down—within certain-controlled time rates—, so as to cooperate with the mold which rests on such mold supoorter as the same arrives at its position.

3. An improved pressing machine for the manufacture of glass articles, pursuant to claim 1, further featured by said mold supporter including a concentrically-laid pushing piston found in same and being part of the bottom of the cavity of the mold, an ejecting stem coupled to the bottom end of such pushing piston, and a mechanism for operating the cited ejecting stem as the mold reaches the extracting station, in order to have the stem making the pusher and the pushing piston to go up, for the final ejection of the finished article.

4. An improved pressing machine for the manufacture of glass articles, pursuant to claim 1, further featured by the fact that the system for the external cooling of supporters and molds is particularly formed by a plenum chamber laid under the gyratory table, a plurality of ducts on such-gyratory table and air-distributing plates which contain ducts directed upwards, placed adjacently about the mold supporters, such plenum chamber being connected, by means of an adequate duct, to a fan blowing pressure cool air, so as to keep a positive pressure in the whole plenum chamber, thereby creating a continuous flow of external cooling air, through the above mentioned air-distributing plates.

5. An improved pressing machine for the manufacture of glass articles pursuant to claim 1, further featured by the fact that said system for the external cooling of the supporters and molds is formed by a gyratory drum supported by the shaft to which the gyratory table is fixed, and a plurality of ducts connected with the drum, the external end of which bifurcates towards one of the peripheral faces of two adjacent molds, in order to cool the supporters and molds.

6. An improved pressing machine for the manufacture of glass articles, pursuant to claim 1, further featured by the fact that the peripheral and external surface of the molds is vertically grooved, so as to allow a uniform distribution of cooling air on the part of them.

7. An improved pressing machine for the manufacture of glass articles, pursuant to claim 1, further featured by the fact that the peripheral and external surface of the molds is horizontally grooved, so as to allow a uniform distribution of cooling air on the part of them.

8. An improved pressing machine for the manufacture of glass articles, pursuant to claim 1, further featured by the fact that said cooling devices of the system for the internal cooling of articles include—each of time separately—; a cooling-air-receiving hood, liable of being coupled and uncoupled to the top surface of the article-forming mold, a hinged arm the free end of which is coupled to said hood, while the other end of such arm is coupled to a pinion laid on a rotating axle, a rack geared with the mentioned pinion, extending through an arm passing through the gyratory table, a follower placed on the bottom end of the cited arm and a cam, to operate the rack vertically, in order to overturn the arm between a position of active hood and a position of passive hood; being said hood and arm hollow, so as to permit them to connect with a cooling-air duct-operated in accordance with certain controlled time rates—, thereby sweeping the internal surface of the article found in the mold, when the hood is coupled thereto.

9. An improved pressing machine for the manufacture of glass articles, pursuant to claim 8 above, featured by the fact that cooling-air hood is hollow.

10. An improved pressing machine for the manufacture of glass articles, pursuant to claim 8 above, further featured by the fact that said cooling-air hood—in the interior of same—has a rolled or flattened, conical dividing wall, which receives air from said arm so as to drive it peripherally, thereby causing the air to sweep the article's surface tangentially—from the external part thereof to the center of it—, and a plurality of ducts laid through the dividing wall—in the central portion of same—and passing through it to the exterior of the hood, thereafter discharging the air to the atmosphere.

11. An improved pressing machine for the manufacture of glass articles, pursuant to claim 1, further featured by the fact that the mechanism which drives the cooling devices of the system for the internal cooling of articles, includes a cam which rotates the overturning arm, so that it may contact such hood with the mold at the moment the pressing piston of the pressing station comes out and keeps the mentioned hood and mold coupled through the two article-cooling stations, until their arrival to the extracting station, where said cam causes the hood to separate from the mold, so that the pusher may take the article out.

12. An improved pressing machine for the manufacture of glass articles, pursuant to claim 11, featured by the fact that such cam also contains another member which causes the hood to go down as it comes out of the extracting station, keeping the same coupled to the mold through the mold-cooling station, and until the arrival thereof to the charging station.

13. An improved pressing machine for the manufacture of glass articles, pursuant to claim 1, further featured by the fact that the rack includes devices for adjusting the height of the pinion which is connected with the same, thus allowing to adjust the height of the device for the internal cooling of articles, in respect of the cavity of the mold, as well.

14. An improved pressing machine for the manufacture of glass articles, pursuant to claim 1, further featured by the fact that the cooling devices of the system for the internal cooling of articles, include—each of them separately—: a fixed, horizontal-and-hollow arm, coupled to the drum, so as to gyrate with it simultaneously with the table, a hollow telescopic arm in respect of the fixed horizontal arm, encompassing on the end thereof a duct or nozzle directed towards the cavity of the mold, which is powered linearly by means of a drive device, until causing it to correspond with the cavity of the mold and backwards, in an inoperative position.

15. An improved pressing machine, pursuant to claim 14, further featured by the fact that the duct or nozzle for cooling includes a disk of a diameter which is shorter than that of the cavity of the mold, so as to permit the cooling air to expand in the interior of the cavity of the mold and to come out through the peripheral annular space which remains between the disk and the cavity of the mold; and by the fact that the driving device is a fluid-operated cylinder-and-piston set which pushes or—withdraws the telescopic arm with the duct or nozzle either to an operative or an inoperative position.

* * * * *

UNITED STATES PATENT AND TRADEMARK OFFICE
CERTIFICATE OF CORRECTION

PATENT NO. : 4,555,258
DATED : May 9, 1984
INVENTOR(S) : VERDIN CURIEL

It is certified that error appears in the above-identified patent and that said Letters Patent is hereby corrected as shown below:

Front page, above the title

Amend inventor's name to read

--VERDIN CURIEL--

Front page, under [75], amend inventor's name to read

--Jesus VERDIN CURIEL--

Signed and Sealed this

Fifth Day of August 1986

[SEAL]

Attest:

DONALD J. QUIGG

Attesting Officer

Commissioner of Patents and Trademarks